United States Patent
Ajan et al.

(10) Patent No.: US 6,905,781 B2
(45) Date of Patent: Jun. 14, 2005

(54) MAGNETIC RECORDING MEDIUM WITH CR<110> PREFERRED GROWTH ALONG A PREDETERMINED DIRECTION, METHOD OF PRODUCING THE SAME AND MAGNETIC STORAGE APPARATUS

(75) Inventors: Antony Ajan, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/444,507

(22) Filed: May 23, 2003

(65) Prior Publication Data

US 2004/0013908 A1 Jan. 22, 2004

Related U.S. Application Data

(63) Continuation of application No. PCT/JP00/08404, filed on Nov. 29, 2000.

(51) Int. Cl.$^7$ ................................................. G11B 5/66
(52) U.S. Cl. ...................... 428/611; 428/667; 428/686; 428/694 TS
(58) Field of Search ................................ 428/611, 667, 428/686, 694 TS

(56) References Cited

U.S. PATENT DOCUMENTS

| | | | |
|---|---|---|---|
| 5,250,338 A | 10/1993 | Shintani et al. | ............... 428/64 |
| 5,536,585 A | 7/1996 | Futamoto et al. | ........... 428/611 |
| 5,599,580 A | * 2/1997 | Futamoto et al. | ........... 427/130 |
| 5,789,090 A | * 8/1998 | Okumura et al. | ........ 428/694 T |
| 5,820,969 A | * 10/1998 | Satoh | .......................... 428/141 |
| 6,150,015 A | 11/2000 | Bertero et al. | ............... 428/332 |

FOREIGN PATENT DOCUMENTS

| | | |
|---|---|---|
| DE | 198 55 454 | 6/1999 |
| JP | 04-106715 | 4/1992 |
| JP | 04-137217 | 5/1992 |
| JP | 05-234069 | 9/1993 |
| JP | 11-006723 | 1/1999 |
| JP | 11-219511 | 8/1999 |
| WO | WO 99/24973 | 5/1999 |

OTHER PUBLICATIONS

Ajan, A., Acharya, B., Abarra, E., Okamoto, I., IEEE Trans. Mag., 37(4), 2001, 1508–1511.*

The Crystallography and Texture of Co–Based Thin Film Deposited on Cr Underlayers. Laughlin, et al., IEEE Transactions on Magnetics, vol. 27, No. 6, Nov. 1999, pp. 4713–4717.

"Elements of Materials Science and Engineering," VanVlack, 1989, Addison–Wesley, Reading Massachusetts, pp. 73–91.

* cited by examiner

*Primary Examiner*—Kevin M. Bernatz
(74) *Attorney, Agent, or Firm*—Greer, Burns & Crain, Ltd.

(57) ABSTRACT

A magnetic recording medium includes a textured surface which is textured in a predetermined direction, a Cr-based underlayer provided on the textured surface and having Cr<110> preferred growth along the predetermined direction so that over approximately 50% of Cr<110> are oriented along the predetermined direction, and a Co-based magnetic layer provided on the underlayer and having Co(1120) preferred growth along the predetermined direction.

9 Claims, 10 Drawing Sheets

MAGNETIC RECORDING MEDIUM WITH CR<110> PREFERRED GROWTH ALONG A PREDETERMINED DIRECTION, METHOD OF PRODUCING THE SAME AND MAGNETIC STORAGE APPARATUS

This is a continuation of International PCT Application No. PCT/JP00/08404 filed Nov. 29, 2000, and published in the English language in International Publication WO 02/45079 A1.

TECHNICAL FIELD

The present invention generally relates to magnetic recording media, methods of producing the same and magnetic storage apparatuses, and more particularly to a magnetic recording medium which is suited for high-density longitudinal recording, a method of producing such a magnetic recording medium, and a magnetic storage apparatus having such a magnetic recording medium.

BACKGROUND ART

The demand for increased capacity of magnetic recording media has resulted in the development of magnetic thin film recording media, such as disk-shaped magnetic thin film recording media (hereinafter simply referred to as magnetic thin film disks), by suitable scaling of both growth and magnetic properties of the magnetic thin film recording layer (hereinafter simply referred to as the magnetic thin film). The magnetic thin film disk should have a high and controllable coercivity, preferably in the range of 2000 Oe to 5000 Oe, and a high remanent magnetization greater than 0.8. Co-based alloys such as CoPtCr, CoCrPtB and CoCrPt-TaB are commonly used for the magnetic thin film. The magnetic thin film is deposited on a nonmagnetic substrate, such as NiP-coated Al, AlMg and glass substrates. In order to overcome the problems of high striction and friction, the surface of the substrate is roughened prior to the deposition of the magnetic thin film, by one of the common mechanical abrasive techniques known as texturing. Mechanical texturing made of the coated substrate have shown to improve the media signal-to-noise ratio (SNR).

The orientation of the axis of easy magnetization (hereinafter simply referred to as the easy axis) of Co in the Co-based magnetic thin film is an important artifact due to the texturing and proper selection of the underlayer disposed under the magnetic thin film. The mechanical texturing eventually gives rise to an orientation ratio of the magnetic thin film, calculated by the ratio of coercivities along the radial direction to that of the circumferential direction in the case of the magnetic thin film disk. However, the origin or orientation ratio was conventionally not clear and was not established clearly. The underlayer structure used normally for good in-plane orientation of the easy axis of the Co in the Co-based magnetic thin film is based on a Cr underlayer deposited at different conditions. In order to improve the media SNR for ultra high-density recording, there is a necessity to grow the crystallographic c-axis of Co in the Co-based magnetic thin film preferentially along the circumferential direction in the case of the magnetic thin film disk.

The Cr(002) texture of the Cr underlayer is essential to grow the Co-based magnetic thin film to have a preferential growth of the Co(1120). This is usually achieved because the lattice matching of Cr(002) and Co(1120) is very good, that is, the mismatch is only 0.5% and 5% respectively along the length and breadth of the lattice. Moreover, the Co(1120) growth allows the magnetization to lie in-plane which is essential for the longitudinal magnetic recording. When the Cr underlayer is grown with the Cr(002) texture, the Cr(002) plane of the individual grains in the Cr underlayer is random within the plane. In other words, the Cr<110> is random within the plane. This is true when there is no mechanical texturing of the substrate and believed to be the same even after the mechanical texturing. Hence, the origin of the orientation ratio of the magnetic thin film was not so clear.

For better crystallographic c-axis orientation and good orientation ratio, the Cr<110> preferred growth along the circumferential direction is a necessary requirement in the case of the magnetic thin film disk. If any other orientation such as the Cr<002> exists along the circumferential direction, an epitaxial growth with the Co crystallographic c-axis preference along the circumferential direction, that is, the mechanically textured direction, is not possible.

DISCLOSURE OF THE INVENTION

Accordingly, it is a general object of the present invention to provide a novel and useful magnetic recording medium, method of producing the same and magnetic storage apparatus, in which the problems described above are eliminated.

Another and more specific object of the present invention is to provide a magnetic recording medium in which an underlayer under a magnetic recording layer has a Cr<110> preferred growth along a direction of a track, a method of producing such a magnetic recording medium, and a magnetic storage apparatus having such a magnetic recording medium. According to the magnetic recording medium, the method of producing the same and the magnetic storage apparatus of the present invention, it is possible to improve the orientation ratio and the media SNR, to thereby enable high-density recording.

Still another object of the present invention is to provide a magnetic recording medium comprising a textured surface which is textured in a predetermined direction, a Cr-based underlayer provided on the textured surface and having Cr<110> preferred growth along the predetermined direction so that over approximately 50% of Cr<110> are oriented along the predetermined direction, and a Co-based magnetic layer provided on the underlayer and having Co(1120) preferred growth along the predetermined direction. According to the magnetic recording medium of the present invention, it is possible to improve the orientation ratio and the media SNR, to thereby enable high-density recording.

A further object of the present invention is to provide a magnetic storage apparatus comprising at least one magnetic recording medium having the structure described above. According to the magnetic storage apparatus of the present invention, it is possible to realize a large capacity by the high-density recording which can be made by improving the orientation ratio and the media SNR of the magnetic recording medium used.

Another object of the present invention is to provide a method of producing a magnetic recording medium, comprising the steps of (a) forming a textured surface which is textured in a predetermined direction, (b) forming a Cr-based underlayer on the textured surface and with Cr<110> preferred growth along the predetermined direction so that over approximately 50% of Cr<110> are oriented along the predetermined direction, and (c) forming a Co-based magnetic layer on the underlayer and with a Co(1120) preferred growth along the predetermined direction. According to the method of producing the magnetic recording medium of the present invention, it is possible to produce a magnetic recording medium having improved orientation ratio and media SNR and capable of realizing high-density recording.

Other objects and further features of the present invention will be apparent from the following detailed description when read in conjunction with the accompanying drawings.

BEST MODE OF CARRYING OUT THE INVENTION

Figure 1A:
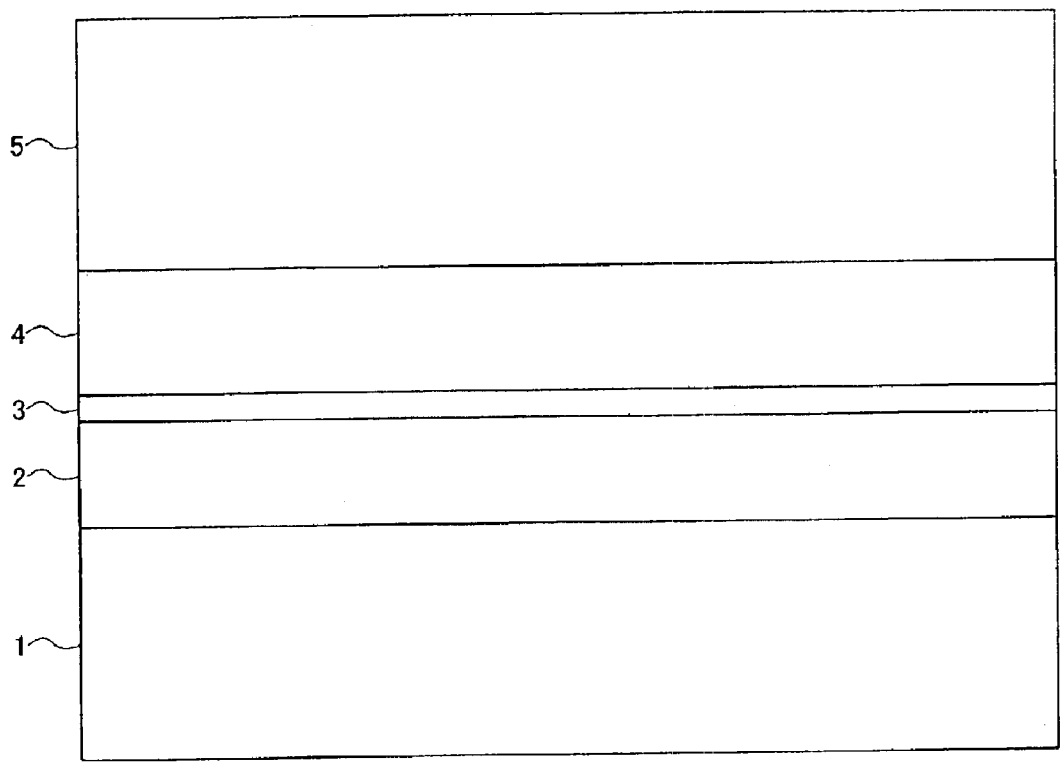
FIGS. 1A and 1B are cross sectional views respectively showing an important part of an embodiment of a magnetic recording medium according to the present invention and a modification thereof.

First, a description will be given of an embodiment of a magnetic recording medium according to the present invention, by referring to FIG. 1A. FIG. 1A is a cross sectional view showing an important part of this embodiment of the magnetic recording medium.

The magnetic recording medium shown in FIG. 1A generally includes a substrate 1, a seed layer 2 having a textured surface 3, an underlayer 4, and a magnetic recording layer (hereinafter simply referred to as a magnetic layer) 5. Of course, a protection layer (not shown) made of C or diamond-like C (DLC) may be provided on the magnetic layer 5, and an organic lubricant layer (not shown) may further be provided on the protection layer.

The substrate 1 is made of a metal such as Al or glass. The seed layer 2 is made of a material such as NiP, CoNiZr, CoNbZr and NiAl. The textured surface 3 of the seed layer 2 is formed by mechanical texturing, for example, and is textured in a predetermined direction in which a track of the magnetic recording medium is formed. In a case where the magnetic recording medium is a magnetic disk having concentric tracks or a spiral track, the textured surface 3 is textured in a circumferential direction of the magnetic disk.

The underlayer 4 is made of a nonmagnetic material such as metals having a BCC structure or alloys thereof. In this embodiment, the underlayer 4 is made of Cr or a Cr-based alloy such as CrMo, CrMoW, CrV and CrW. In the case where the Cr-based alloy is used for the underlayer 4, a Mo-content of the Cr-based alloy is desirably greater than or equal to 1 at %, a W-content of the Cr-based alloy is desirably less than or equal to 30 at %, and a V-content of the Cr-based alloy is desirably less than or equal to 30 at %. According to experiments conducted by the present inventors, the relatively small content of Mo, W and/or V in the Cr-based alloy was found to increase the orientation ratio of the magnetic layer 5. It may be regarded that such a small content of Mo, W and/or V in the Cr-based alloy helps expand the lattice of the underlayer 4, so as to provide a good lattice match with respect to the magnetic layer 5 provided thereon. The Cr-based underlayer 4 has Cr<110> preferred growth along the predetermined direction so that over approximately 50% of Cr<110> are oriented along the predetermined direction.

In addition, the underlayer 4 has a thickness of approximately 1 nm or greater, and preferably approximately 2 nm or greater in order to form a good grain growth and to obtain a good epitaxial relation with Co(0002) of the magnetic layer 5 described below. On the other hand, according to experiments conducted by the present inventors, it is desirable that the thickness of the underlayer 4 is less than approximately 40 nm, and preferably less than approximately 15 nm in order to avoid the orientation ratio from decreasing.

The magnetic layer 5 is made of a Co-based material such as CoCrPtB, CoCrPt, CoCrTa, CoCrPtTa, CoCrPtTaB and CoCrPtBCu. The magnetic layer 5 has Co(1120) preferred growth along the predetermined direction.

Figure 1B:
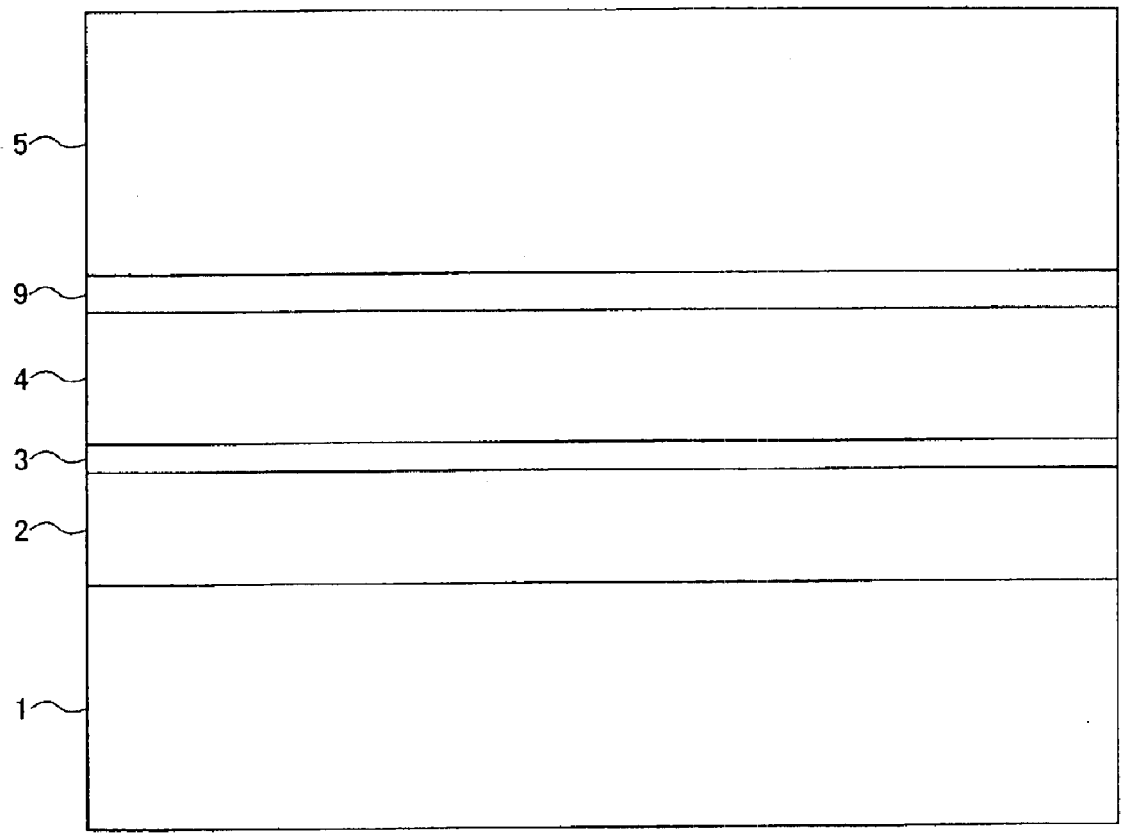

FIG. 1B is a cross sectional view showing an important part of a modification of this embodiment of the magnetic recording medium. In FIG. 1B, those parts which are the same as those corresponding parts in FIG. 1A are designated by the same reference numerals, and a description thereof will be omitted.

The magnetic recording medium shown in FIG. 1B additionally includes an intermediate layer 9 interposed between the underlayer 4 and the magnetic layer 5. The intermediate layer 9 is made of a CoCr-based alloy having a Cr content greater than or equal to 25 at % and less than or equal to 45 at %. The provision of the intermediate layer 9 further improves the orientation ratio of the magnetic layer 5, calculated by the ratio of coercivities along a certain direction to that of the predetermined direction of the magnetic recording medium, where the certain direction is perpendicular to the predetermined direction. In the case of the magnetic disk, the orientation ratio is calculated by the ratio of coercivities along the radial direction to that of the circumferential direction of the magnetic disk.

The lattice expansion and the orientation ratio are further described in Kataoka et al., "Crystallographic Anisotropy In Thin Film Magnetic Recording Media Analyzed With X-Ray Diffraction", J. Appl. Phys. 73(11), pp.7591–7598, 1 Jun. 1993, Johnson et al., "In-Plane Anisotropy In Thin-Film Media: Physical Origins Of Orientation Ratio", IEEE Trans. Magn. vol.31, pp.2721–2727, 1995, and Kim et al., "Microstructural Origin Of In-Plane Magnetic Anisotropy In Magnetron In-Line Sputtered CoPtCr Thin-Film Disks", J. Appl. Phys. 74(7), pp.4643–4650, 1 Oct. 1993, the disclosures of which are hereby incorporated by reference.

According to the embodiment and the modification of the magnetic recording medium, the crystallographic orientation and hence the easy axis orientation of the magnetic layer 5 is finely controlled, so that the easy axis orientation of the magnetic layer 5 allows bits to be written easily along a head field direction. Consequently, the media SNR of the magnetic recording medium is improved, to thereby enable stable high-density recording.

Figure 2:
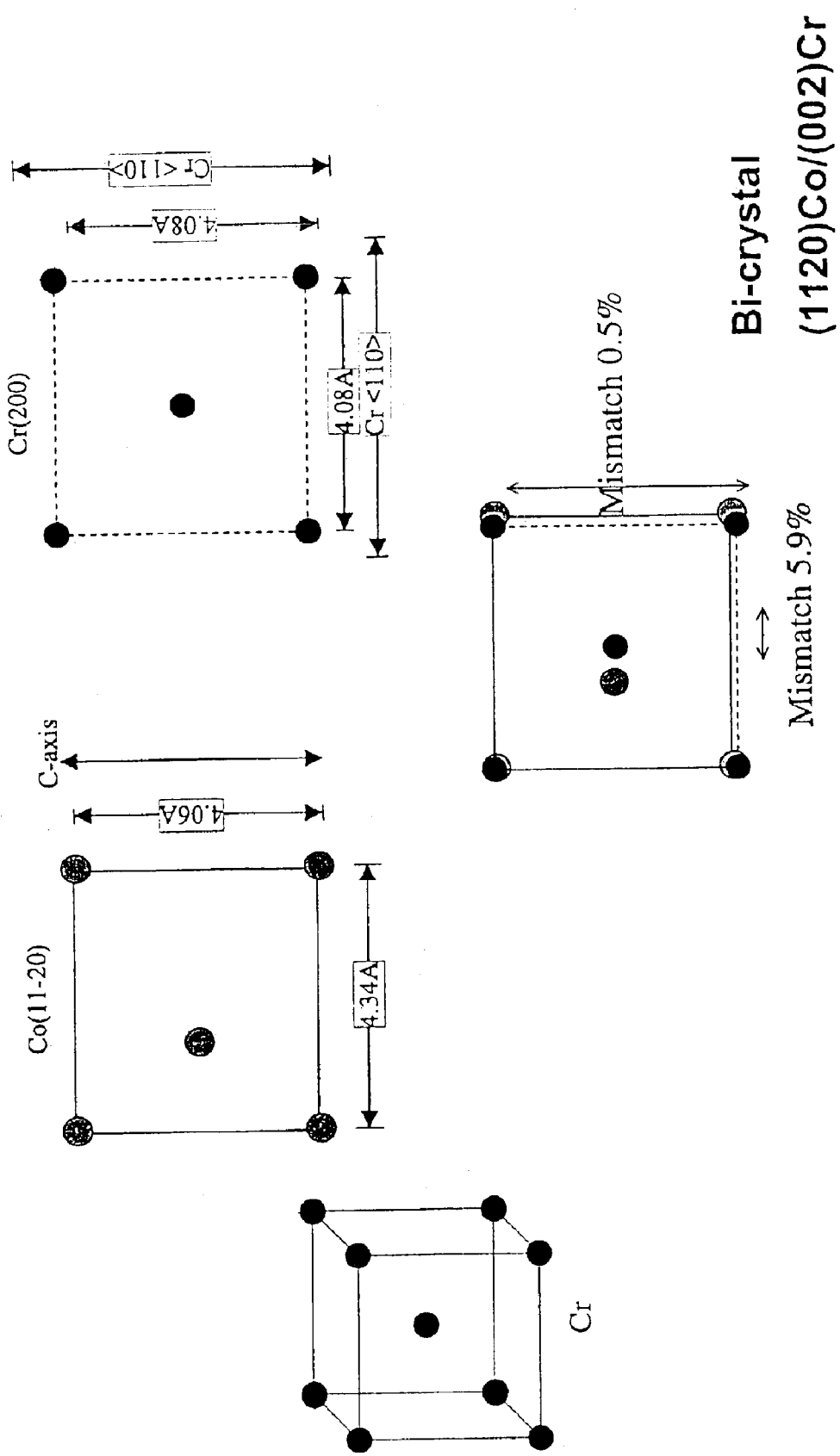
FIG. 2 is a diagram for explaining the lattice mismatch between Cr(002) and Co(1120)

FIG. 2 is a diagram for explaining the lattice mismatch between Cr(002) of the underlayer 4 and Co(1120) of the magnetic layer 5. FIG. 2 shows the lattice mismatch corresponding to the different Cr planes and the Co planes.

The Cr(002) texture of the underlayer 4 is essential to grow the magnetic layer 5 to have a preferential growth of the Co(1120). This is usually achieved because the lattice matching of Cr(002) and Co(1120) is very good, that is, the mismatch is only 0.5% and 5% respectively along the length and breadth of the lattice, as shown in FIG. 2. Moreover, the Co(1120) growth allows the magnetization to lie in-plane which is essential for the longitudinal magnetic recording. When the underlayer 4 is grown with the Cr(002) texture, the Cr(002) plane of the individual grains in the underlayer 4 is random within the plane. In other words, the Cr<110> is random within the plane. This is true when there is no textured surface 3.

For better crystallographic c-axis orientation and good orientation ratio, the Cr<110> preferred growth along the predetermined direction is a necessary requirement. If any other orientation such as the Cr<002> exists along the predetermined direction, an epitaxial growth with the Co crystallographic c-axis preference along the predetermined direction, that is, the texture direction of the textured surface 3, is not possible.

Figure 3:
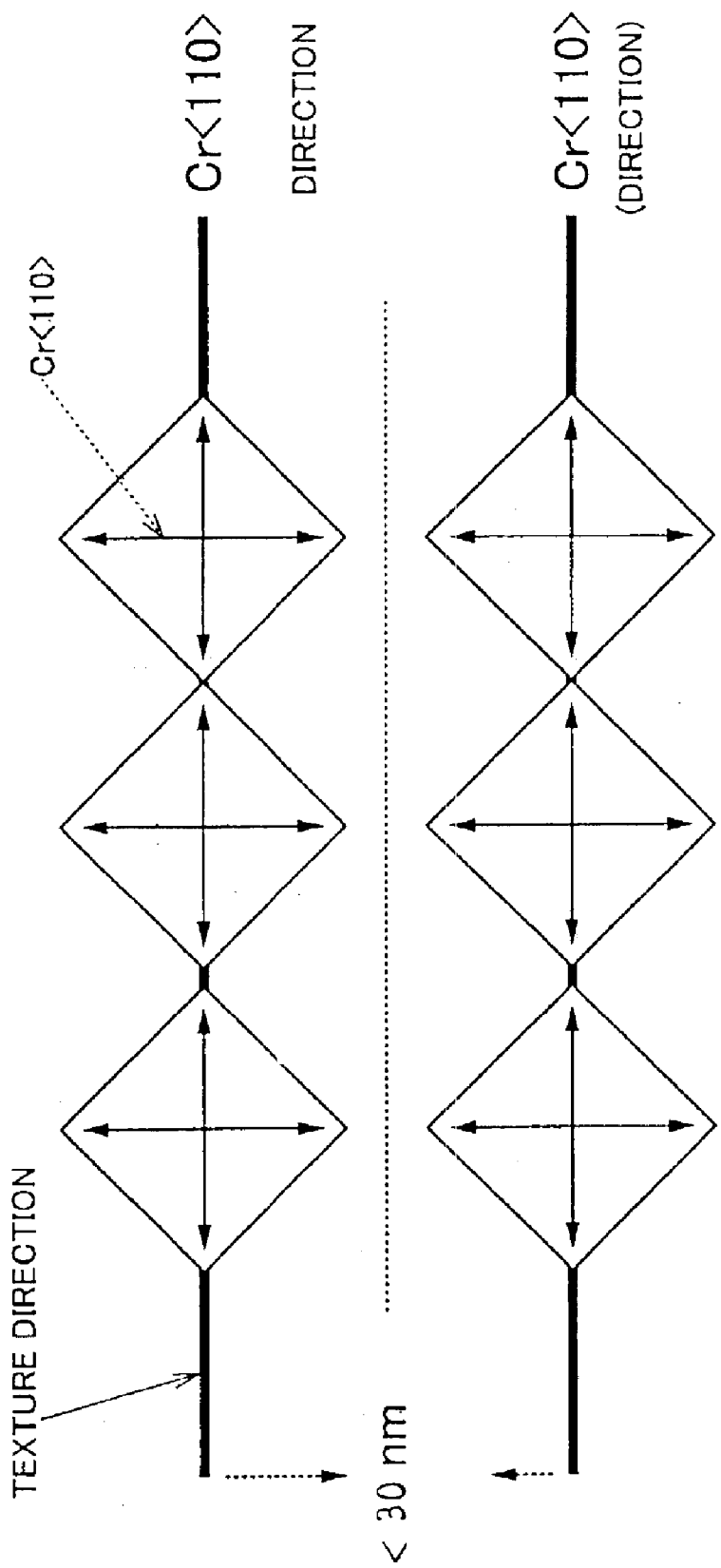
FIG. 3 is a diagram for explaining Cr grains on a textured surface in a plan view.
Figure 4:
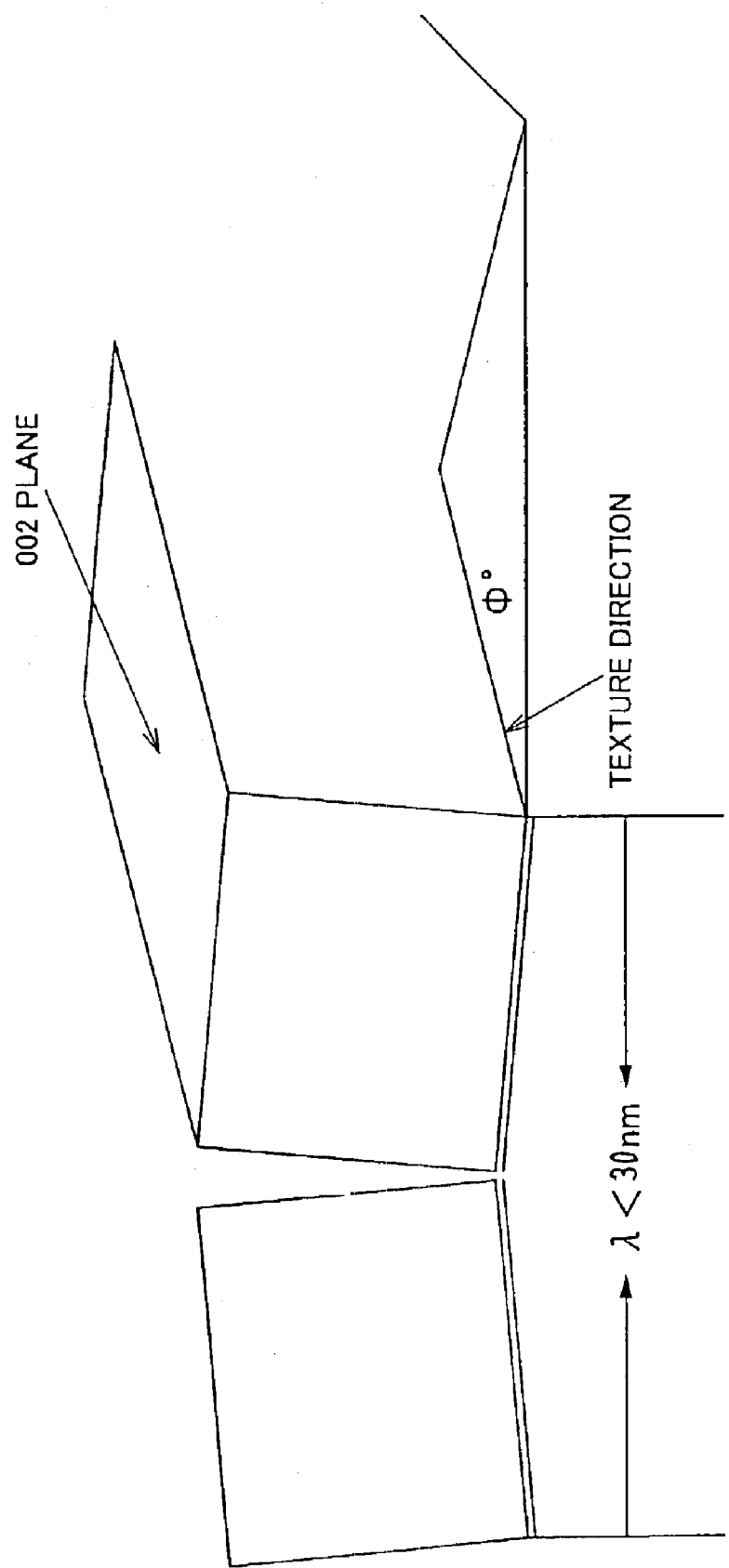
FIG. 4 is a diagram for explaining the Cr grains on the textured surface in a cross sectional view.

FIG. 3 is a diagram for explaining Cr grains of the underlayer 4 on the textured surface 3 in a plan view. FIG. 4 is a diagram for explaining the Cr grains of the underlayer 4 on the textured surface 3 in a cross sectional view. Further, FIG. 5 is a diagram for explaining the texturing of the textured surface 3 in a cross sectional view in relation to desired texture parameters.

Figure 5:
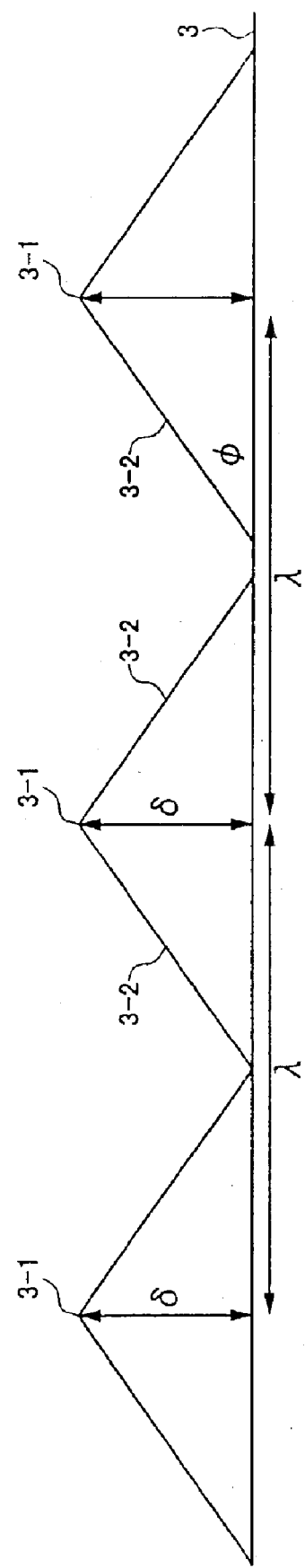
FIG. 5 is a diagram for explaining the texturing in a cross sectional view in relation to desired texture parameters.

In this embodiment, the textured surface 3 has a distance $\lambda$ between two mutually adjacent texturing lines 3-1 satisfying a relationship $5<\lambda<30$ nm, and an angle $\phi$ between the textured surface 3 and an oblique texture plane 3-2 satisfying a relationship $0.5<\phi<7$ degrees, as shown in FIG. 5. In addition, a height $\delta$ of the texturing line 3-1 relative to the textured surface 3 is 0.65 nm to 0.8 nm. The resulting orientation ratio of the magnetic layer 5 provided on the underlayer 4 which is provided on this textured surface 3 is greater than approximately 1.2 and less than approximately 1.9. However, depending on the adjustment of the Cr<110> orientation of the underlayer 4, the texturing of the textured surface 3 and the deposition conditions of the underlayer 4, the present inventors have confirmed that the orientation ratio of the magnetic layer 5 provided on the underlayer 4 can be made greater than or equal to 2.

The present inventors studied the preferential orientation of the Cr<011> of the underlayer 4, by observing TEM diffraction images of a large number of Cr grains in the underlayer 4. From a single Cr grain diffraction image, the Cr<110> direction with respect to the texture direction of the textured surface 3, that is, with respect to the predetermined direction, was obtained. More than 100 individual Cr grains were observed in order to obtain a reasonably good statistical distribution.

Figure 6:
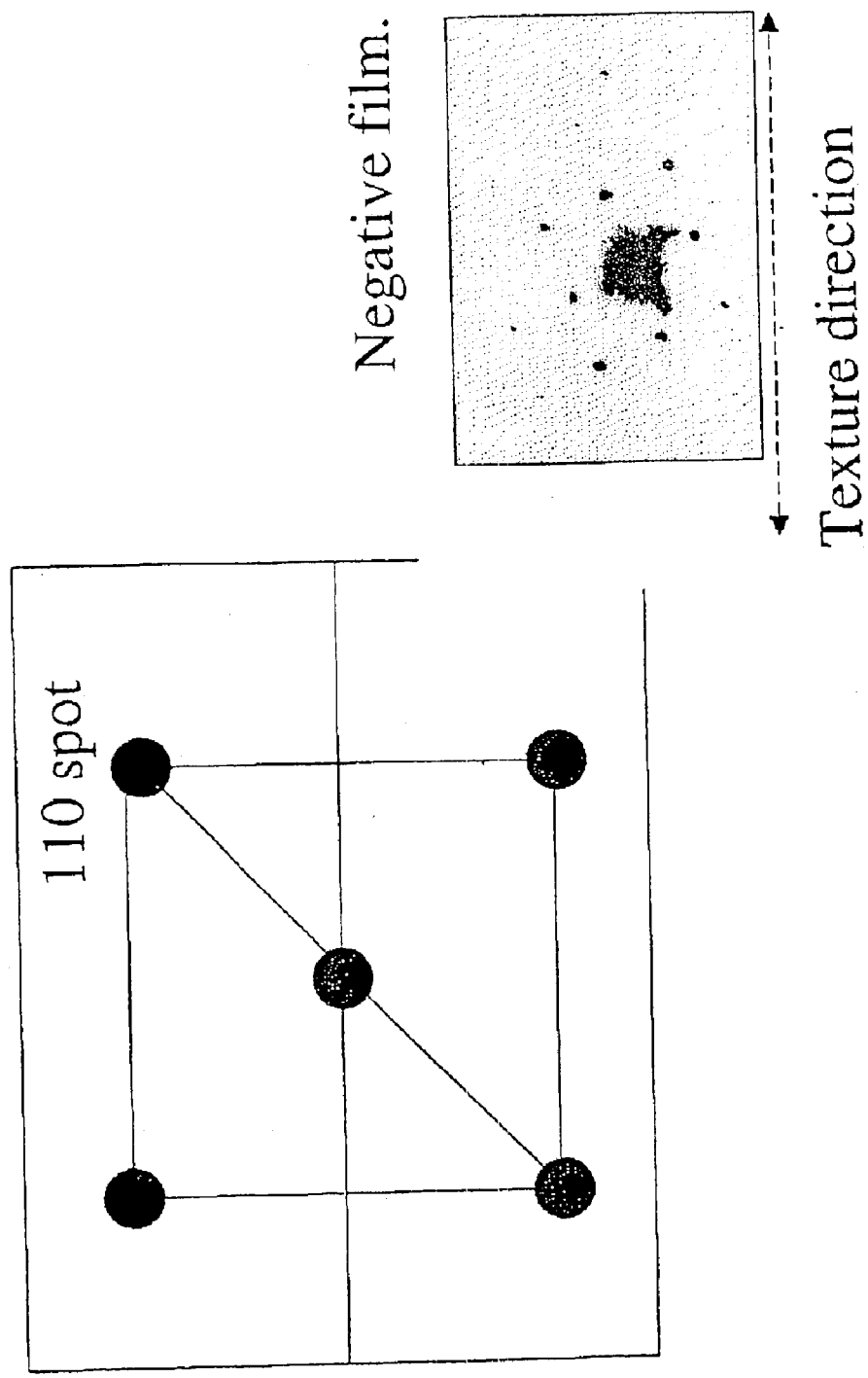
FIG. 6 is a diagram showing a Cr<110> direction observation of an underlayer from a TEM diffraction image.

The individual Cr grain images were recorded onto a negative film as shown on the bottom left part of FIG. 6.

FIG. 6 is a diagram showing the Cr<110> direction observation of the underlayer 4 from the TEM diffraction image. Because the single Cr grain image is observed, spot images are obtained, that is, 4 spots corresponding to the first nearest neighbor and 1 center spot, are obtained. The image of the spots on the negative film shown on the bottom left part of FIG. 6 is schematically represented on the left part of FIG. 6 with the Cr<110> direction. The negative film edge direction was adjusted while taking the photograph, so that the film edge direction matches the texture direction of the textured surface 3. Hence, the Cr<110> direction of each Cr grain in the underlayer 4 was obtained from FIG. 6. In other words, it was possible to obtain the Cr<110> direction of the underlayer 4 with respect to the texture direction $\theta$, by observing the value of $\theta$.

Figures 7A, 7B:
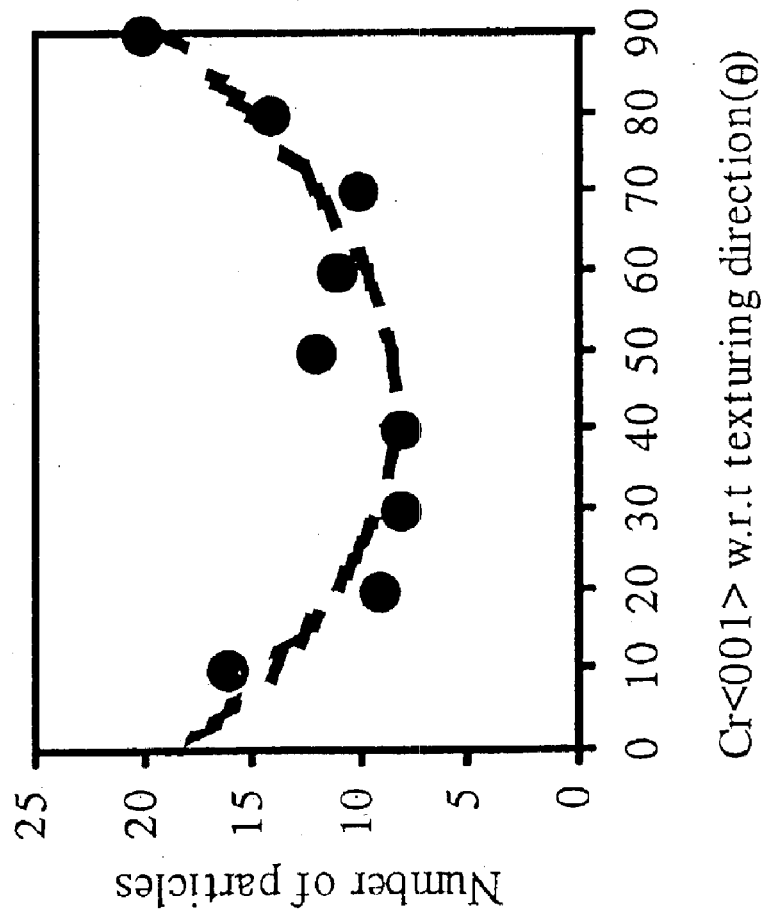
FIG. 7A is a diagram showing a statistical distribution of Cr<110> of the Cr underlayer on the textured surface with respect to the texture direction of the textured surface.
FIG. 7B is a diagram showing a single TEM image of the Cr grains of the Cr underlayer on the textured surface, for observing a dark field intensity pattern.

FIG. 7A is a diagram showing a statistical distribution of Cr<110> of the Cr underlayer 4 on the textured surface 3 with respect to the texture direction of the textured surface 3, for approximately 100 Cr grains. In FIG. 7A, the ordinate indicates the number of Cr grains, and the abscissa indicates the angle (degrees) of the Cr<110> with respect to the texture direction $\theta$ of the textured surface 3. As may be seen from FIG. 7A, a larger number of Cr grains with the Cr<110> orientation is found near the angles 0 degree and 90 degrees in comparison to other angles. Accordingly, over approximately 50% of the Cr<110> preferred growth along the texture direction $\theta$ was confirmed.

FIG. 7B is a diagram showing a single TEM image of approximately 1000 Cr grains of the Cr underlayer 4 on the textured surface 3, for observing a dark field intensity pattern. In this case, the dark field intensity pattern is a ring corresponding to Cr<110> of the underlayer 4 on the textured surface 3. As may be seen from FIG. 7B, the ring intensity is not uniform, and is dark at opposite angles as indicated by A1 and A2. Hence, the Cr<110> preferred growth along the texture direction $\theta$ was confirmed.

Results similar to those shown in FIGS. 7A and 7B were obtained with respect to the CrMo underlayer 4 on the textured surface 3.

Figure 8A:
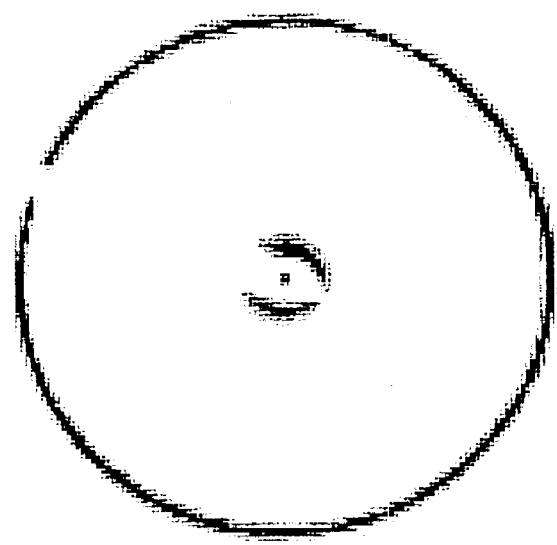
FIG. 8A is a diagram showing a statistical distribution of Cr<110> of the Cr underlayer on a non-textured surface with respect to the texture direction of the textured surface.

FIG. 8A is a diagram showing a statistical distribution of Cr<110> of the Cr underlayer 4 on a non-textured surface, for approximately 100 Cr grains. In FIG. 8A, the ordinate indicates the number of Cr grains, and the abscissa indicates the angle (degrees) of the Cr<110> with respect to the predetermined direction, that is, the texture direction $\theta$ of the textured surface 3. As may be seen from FIG. 8A, the Cr grains with the Cr<110> orientation are distributed at random. Accordingly, the Cr<110> preferred growth along the texture direction $\theta$ was not found.

Figure 8B:
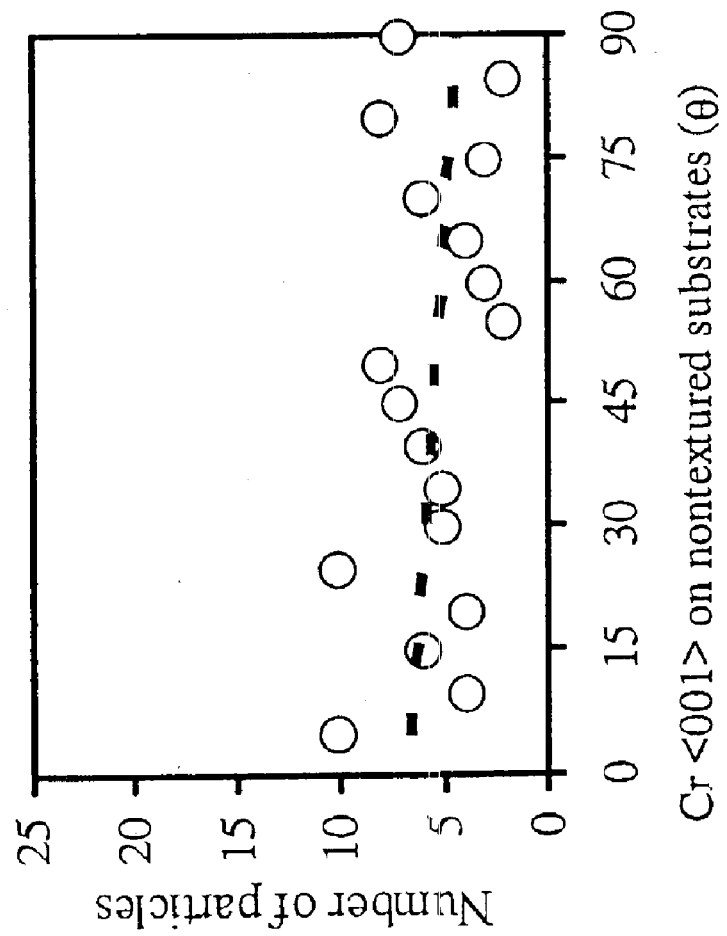
FIG. 8B is a diagram showing a single TEM image of the Cr grains of the Cr underlayer on the non-textured surface, for observing a dark field intensity pattern.

FIG. 8B is a diagram showing a single TEM image of approximately 1000 Cr grains of the Cr underlayer 4 on the non-textured surface, for observing a dark field intensity pattern. In this case, the dark field intensity pattern is a ring corresponding to Cr<110> of the underlayer 4 on the non-textured surface. As may be seen from FIG. 8B, the ring intensity is uniform. Hence, the Cr<110> preferred growth along the texture direction $\theta$ was not found.

Results similar to those shown in FIGS. 8A and 8B were obtained with respect to the CrMo underlayer 4 on the non-textured surface.

Next, a description will be given of an embodiment of a method of producing a magnetic recording medium according to the present invention. For the sake of convenience, it is assumed that the method produces the embodiment of the magnetic recording medium described above.

The method of producing the magnetic recording medium includes a first step which forms the textured surface 3 shown in FIG. 1A which is textured in a predetermined direction, a second step which forms the Cr-based underlayer 4 on the textured surface 3 by dc sputtering, and with Cr<110> preferred growth along the predetermined direction so that over approximately 50% of Cr<110> are oriented along the predetermined direction, and a third step which forms the Co-based magnetic layer 5 on the underlayer 4 by dc sputtering, and with a Co(1120) preferred growth along the predetermined direction.

The first step may form the textured surface 3 by mechanically texturing the surface of the seed layer 2. The textured surface 3 is formed to have the distance λ between the two mutually adjacent texturing lines 3-1 satisfying the relationship 5<λ<30 nm, and the angle φ between the textured surface 3 and the oblique texture plane 3-2 satisfying the relationship 0.5<φ<7 degrees.

The second step desirably forms the underlayer 4 by a dc sputtering process at a substrate temperature Ts satisfying 150° C.<Ts<260° C. and a substrate bias voltage Vb satisfying −50 V<Vb<−250 V.

A modification of this embodiment of the method of producing the magnetic recording medium produces the modification of the magnetic recording medium shown in FIG. 1B. Hence, the method of producing the magnetic recording medium includes in addition to the first through third steps, a step which is carried out after the second step and before the third step, to form the CoCr-based intermediate layer 9 between the underlayer 4 and the magnetic layer 5 by dc sputtering.

According to the embodiment and the modification of the method of producing the magnetic recording medium, the surface topology and magnetic characteristics of the magnetic recording medium are finely controlled by adjusting the crystallographic orientation of the underlayer 4, by suitable texturing to form the textured surface 3 and suitable sputtering conditions to form the underlayer 4. As a result, it is possible to produce the magnetic recording medium having improved orientation ratio and media SNR.

Figure 9:
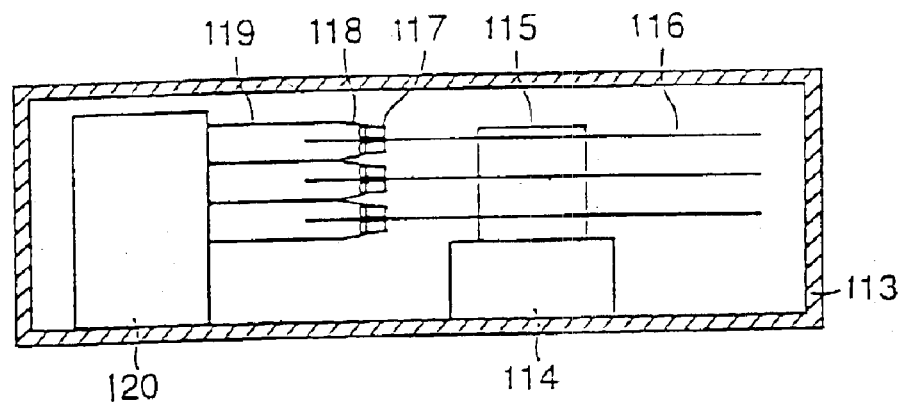
FIG. 9 is a cross sectional view showing an important part of an embodiment of a magnetic storage apparatus according to the present invention.

Next, a description will be given of an embodiment of a magnetic storage apparatus according to the present invention, by referring to FIGS. 9 and 10. FIG. 9 is a cross sectional view showing an important part of this embodiment of the magnetic storage apparatus, and FIG. 10 is a plan view showing the important part of this embodiment of the magnetic storage apparatus.

Figure 10:
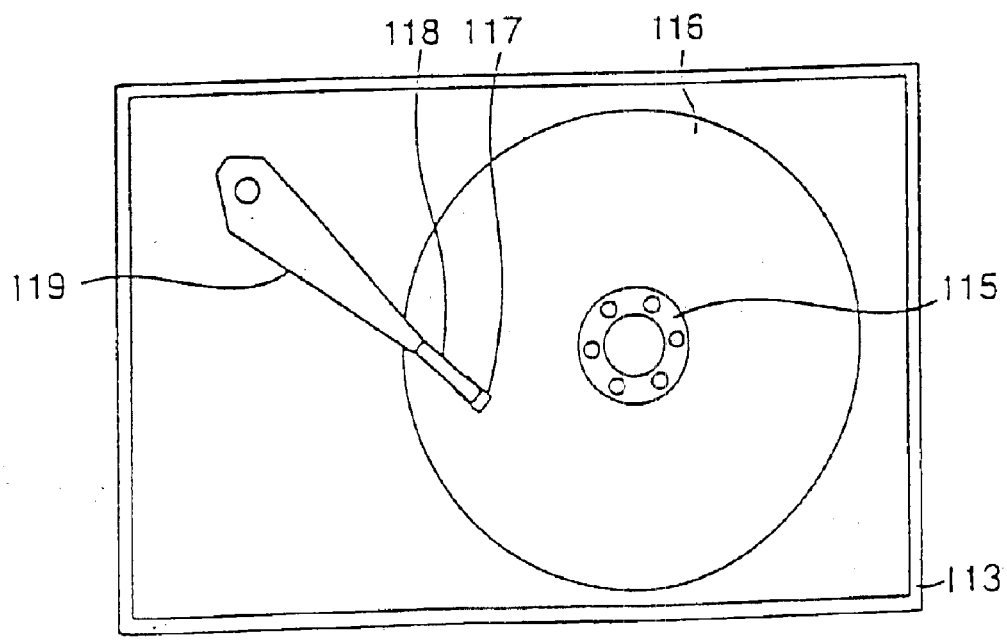
FIG. 10 is a plan view showing the important part of the embodiment of the magnetic storage apparatus.

As shown in FIGS. 9 and 10, the magnetic storage apparatus generally includes a housing 113. A motor 114, a hub 115, a plurality of magnetic recording media 116, a plurality of recording and reproducing heads 117, a plurality of suspensions 118, a plurality of arms 119, and an actuator unit 120 are provided within the housing 113. The magnetic recording media 116 are mounted on the hub 15 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of the embodiment or the modification of the magnetic recording medium described above in conjunction with FIGS. 1A and 1B. Of course, the number of magnetic recording media 116 is not limited to three, and only one, two or four or more magnetic recording media 116 may be provided.

The basic construction of the magnetic storage unit is not limited to that shown in FIGS. 9 and 10. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
   a textured surface which is textured in a predetermined direction;
   a Cr-based underlayer provided on the textured surface and having Cr<110> preferred growth along the predetermined direction so that over approximately 50% of Cr<110> are oriented along the predetermined direction; and
   a Co-based magnetic layer provided on the underlayer and having Co(1120) preferred growth along the predetermined direction;
   wherein the textured surface has a distance λ between two mutually adjacent texturing lines satisfying a relationship 5<λ<30 nm, and an angle φ between the textured surface and an oblique texture plane satisfying a relationship 0.5<φ<7 degrees.

2. The magnetic recording medium as claimed in claim 1, wherein the textured surface is formed by a mechanically textured surface of a seed layer which is made of a material selected from a group of NiP, CoNiZr, CoNbZr and NiAl.

3. The magnetic recording medium as claimed in claim 1, wherein the underlayer is made of a material selected from a group of Cr, CrMo, CrMoW, CrV and CrW, where a Mo-content is greater than or equal to 1 at %, a W-content is less than or equal to 30 at %, and a V-content is less than or equal to 30 at %.

4. The magnetic recording medium as claimed in claim 1, wherein the magnetic layer is made of a material selected from a group of CoCrPtB, CoCrPt, CoCrTa, CoCrPtTa, CoCrPtTaB and CoCrPtBCu.

5. The magnetic recording medium as claimed in claim 1, which further comprises a CoCr-based intermediate layer interposed between the underlayer and the magnetic layer, where a Cr content is greater than or equal to 25 at % and is less than or equal to 45 at %.

6. The magnetic recording medium as claimed in claim 1, wherein the magnetic recording medium has a disk shape, and the predetermined direction is a circumferential direction of the disk shape.

7. The magnetic recording medium as claimed in claim 1, wherein the underlayer has a thickness greater than approximately 2 nm and less than approximately 15 nm.

8. A magnetic storage apparatus comprising at least one magnetic recording medium, the recording medium including
   a textured surface which is textured in a predetermined direction;
   a Cr-based underlayer provided on the textured surface and having Cr<110> preferred growth along the predetermined direction so that over approximately 50% of Cr<110> are oriented along the predetermined direction; and
   a Co-based magnetic layer provided on the underlayer and having Co(1120) preferred growth along the predetermined direction;

wherein the textured surface has a distance λ between two mutually adjacent texturing lines satisfying a relationship 5<λ<30 nm, and an angle φ between the textured surface and an oblique texture plane satisfying a relationship 0.5<φ<7 degrees.

9. A method of producing a magnetic recording medium, comprising the steps of:

(a) forming a textured surface which is textured in a predetermined direction;

(b) forming a Cr-based underlayer on the textured surface and with Cr<110> preferred growth along the predetermined direction so that over approximately 50% of Cr<110> are oriented along the predetermined direction; and (c) forming a Co-based magnetic layer on the underlayer and with a Co(1120) preferred growth along the predetermined direction;

wherein said step (a) forms the textured surface to have a distance λ between two mutually adjacent texturing lines satisfying a relationship 5<λ<30 nm, and an angle φ between the textured surface and an oblique texture plane satisfying a relationship 0.5<φ<7 degrees.

* * * * *